United States Patent [19]
Orlando

[11] Patent Number: 6,102,067
[45] Date of Patent: Aug. 15, 2000

[54] BIFURCATED FILL VALVE ASSEMBLY

[76] Inventor: Mark A. Orlando, 1211 Bourne Wood, Sugarland, Tex. 77478

[21] Appl. No.: 08/870,035

[22] Filed: Jun. 5, 1997

[51] Int. Cl.[7] .......................... F16K 31/20; F16K 33/00; F16L 41/00
[52] U.S. Cl. .................... 137/315.08; 137/436; 137/444; 251/148; 285/204; 285/220; 285/402
[58] Field of Search ..................... 137/426, 436, 137/437, 444, 441, 443, 315.01, 315.08; 285/196, 204, 220, 402; 251/148

[56] References Cited

U.S. PATENT DOCUMENTS

| | | | |
|---|---|---|---|
| 948,748 | 2/1910 | Van Deusen | 137/444 |
| 955,457 | 4/1910 | Geurink | 137/444 |
| 1,329,141 | 1/1920 | Rice | 285/402 |
| 2,382,500 | 8/1945 | Owens | 137/437 |
| 3,332,433 | 7/1967 | Edmondson | 137/444 |
| 3,930,516 | 1/1976 | Flinner et al. | 137/436 |
| 3,982,557 | 9/1976 | Acevedo | 137/426 |
| 4,065,095 | 12/1977 | Johnson | 137/437 |
| 4,100,928 | 7/1978 | Schoepe | 137/437 |
| 4,286,619 | 9/1981 | Straus | 137/432 |
| 4,527,745 | 7/1985 | Butterfield et al. | 285/402 |
| 4,574,826 | 3/1986 | Johnson | 137/426 |
| 4,600,031 | 7/1986 | Nestich | 137/426 |
| 4,709,721 | 12/1987 | Gish | 137/444 |
| 4,765,363 | 8/1988 | Pi-Yu | 137/414 |
| 5,035,257 | 7/1991 | Antunez | 137/432 |
| 5,366,262 | 11/1994 | Couvreur | 285/402 |
| 5,598,865 | 2/1997 | Musso | 137/426 |
| 5,678,600 | 10/1997 | Locke et al. | 137/414 |
| 5,743,290 | 4/1998 | Locke et al. | 137/414 |

FOREIGN PATENT DOCUMENTS 1337110  11/1973  United Kingdom .................. 137/443

*Primary Examiner*—George L. Walton

[57] ABSTRACT

A new Bifurcated Fill Valve Assembly for permitting removal of a fill valve from a toilet tank without disturbing the seal at the toilet tank and without disconnecting the water supply line. The inventive device includes a tank fitting extended through and mounted within an opening in a wall of a toilet tank and a fill valve including a valve body having an inlet portion wherein the inlet portion of the fill valve is releasably coupled to the tank fitting within the toilet tank. As such, the fill valve can be uncoupled from the tank fitting and removed from the toilet tank while the tank fitting remains mounted within the toilet tank and coupled to a water supply conduit that supplies water to the fill valve when in use.

6 Claims, 6 Drawing Sheets

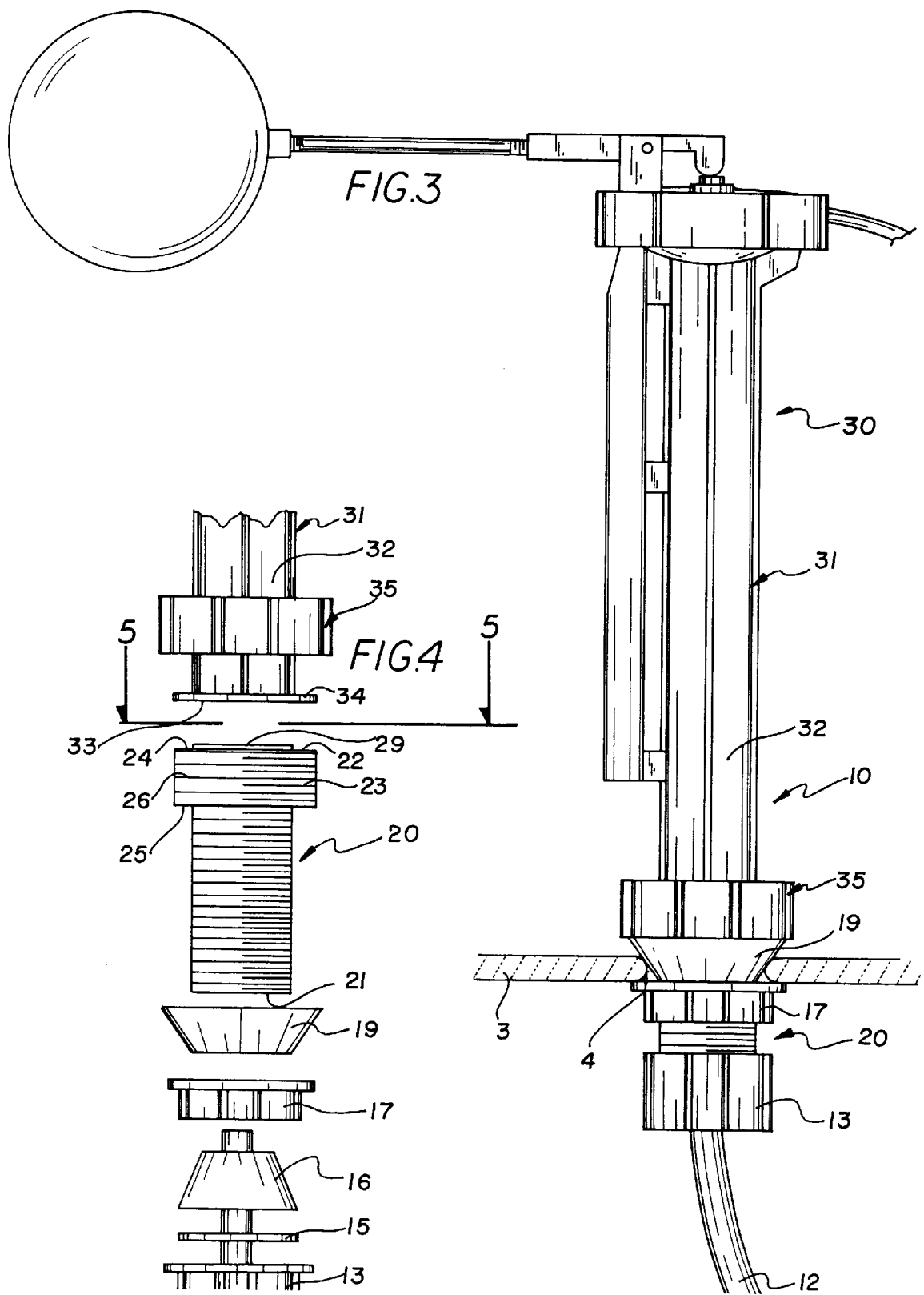

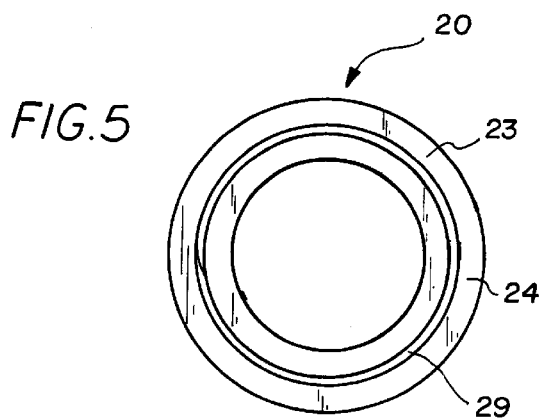
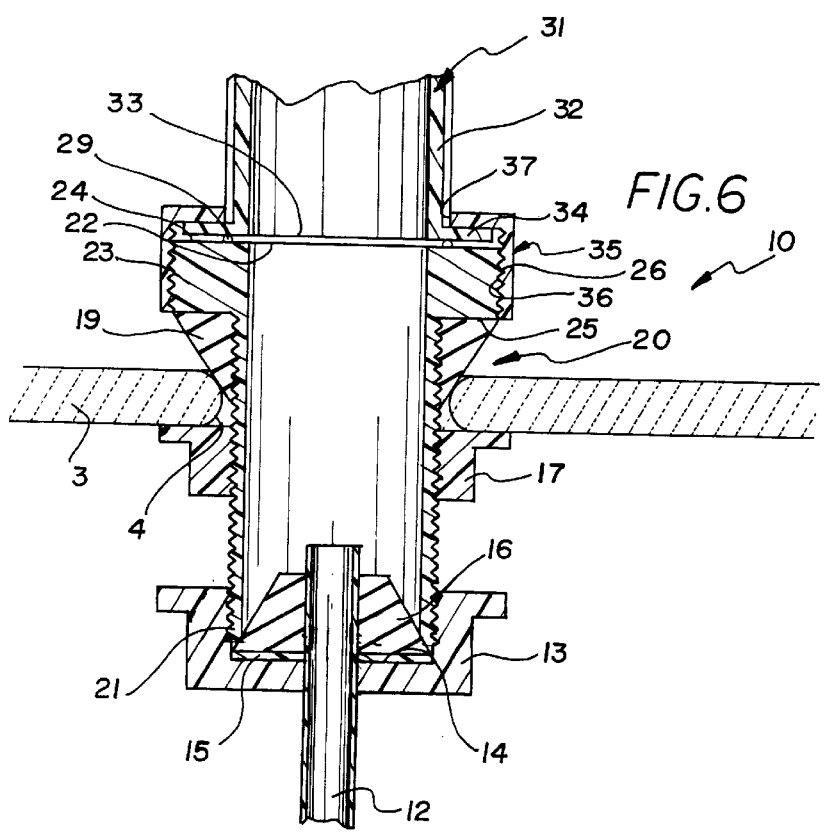

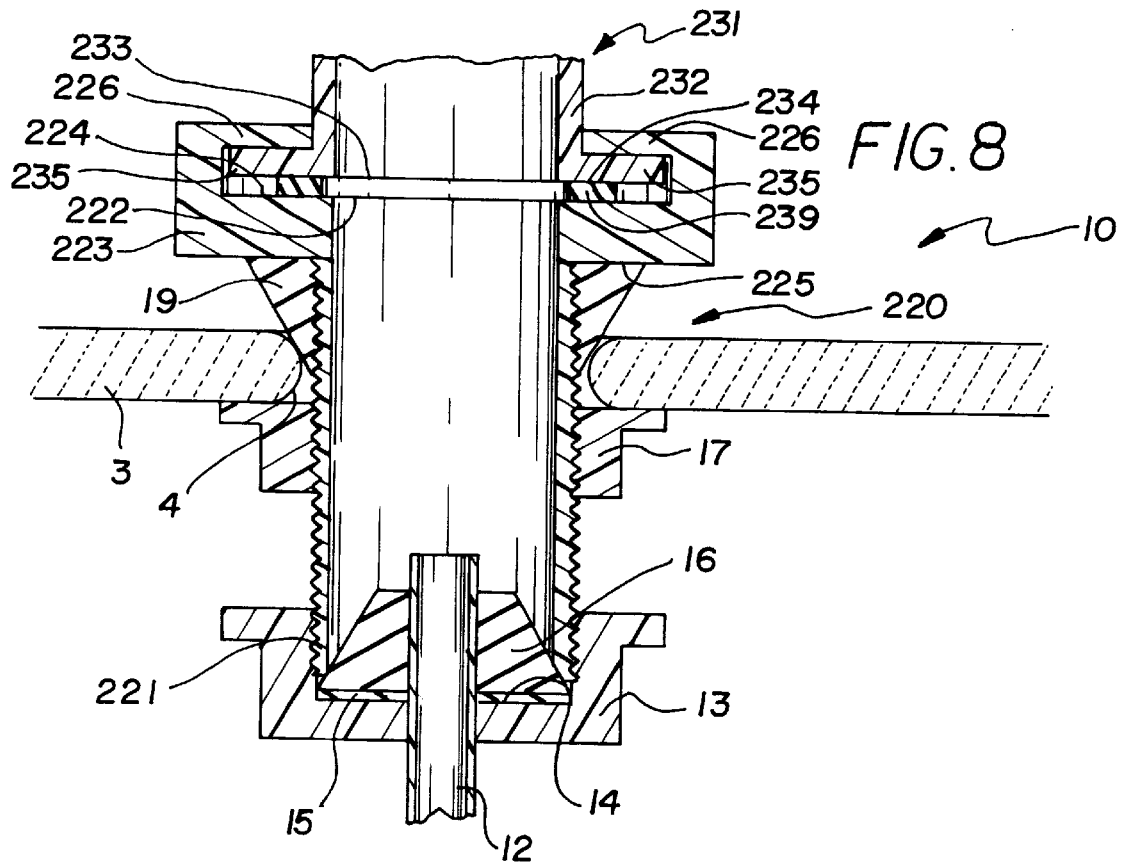
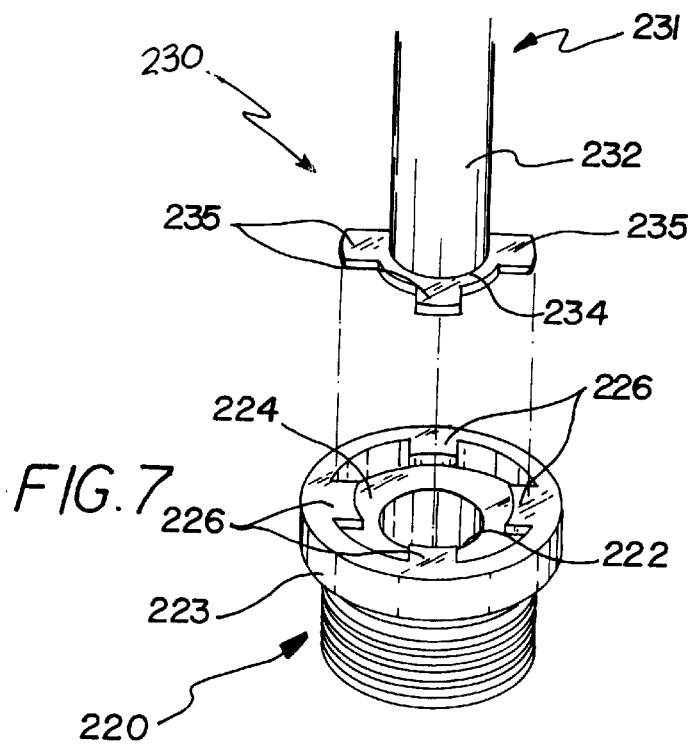

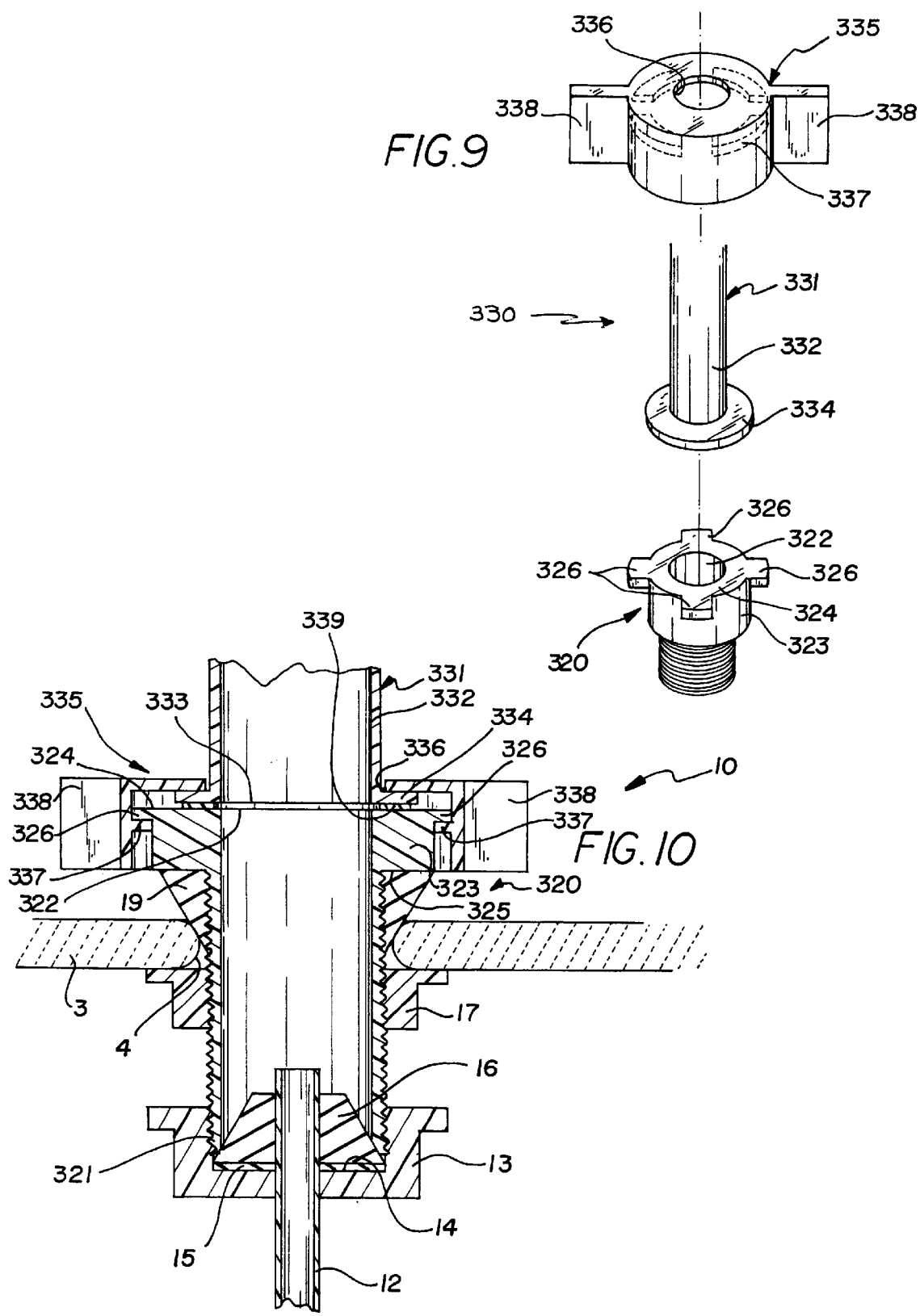

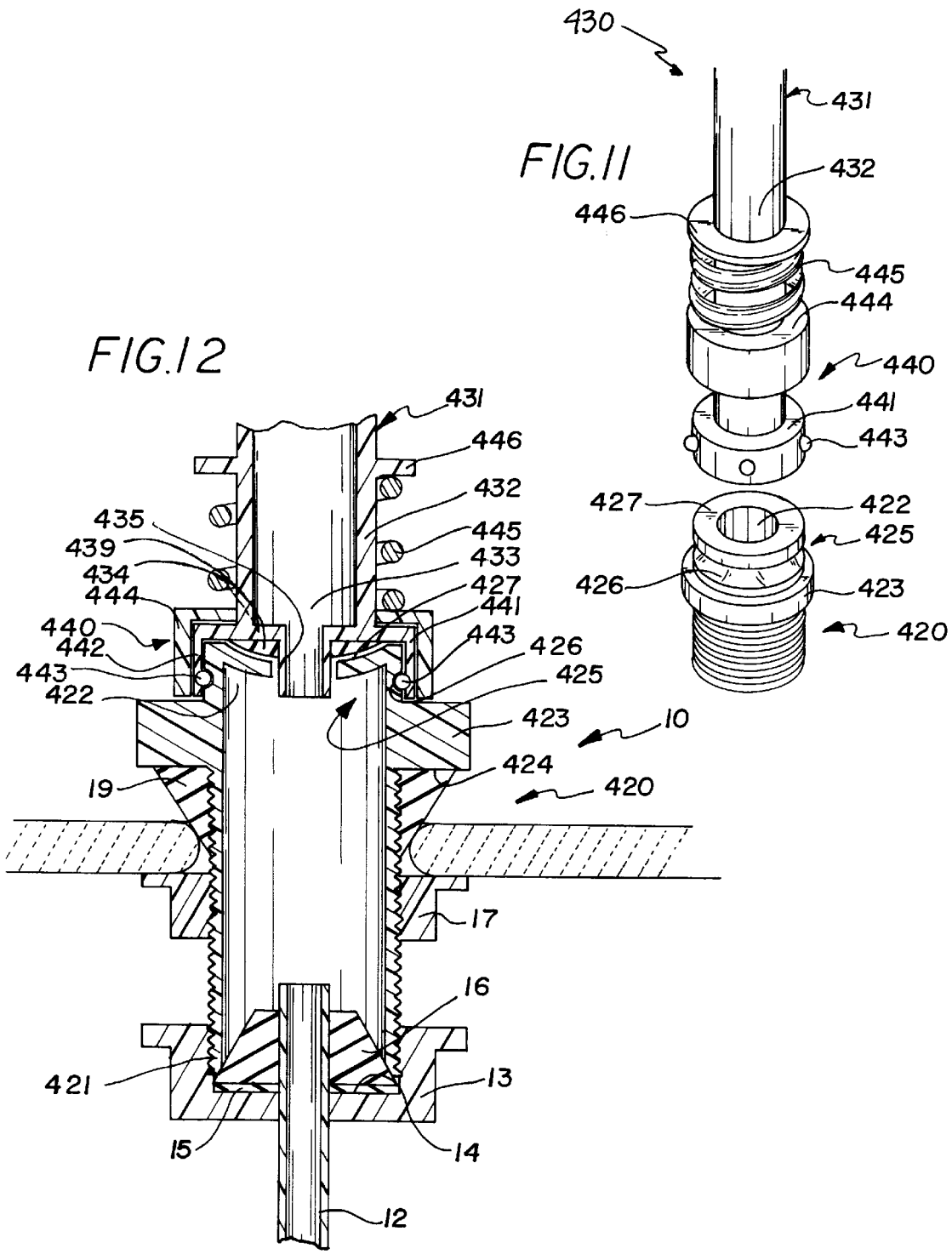

BIFURCATED FILL VALVE ASSEMBLY

BACKGROUND OF THE INVENTION

1. Related Data

The subject matter of the present utility patent application has been registered with the United States Patent and Trademark Office under the Disclosure Document Program. The request was received at the United States Patent and Trademark Office on Mar. 6, 1996 and was assigned the registration number 393,673.

2. Field of the Invention

The present invention relates to fill valves for toilet tanks and more particularly pertains to a new Bifurcated Fill Valve Assembly for permitting removal of a fill valve from a toilet tank without disturbing the seal at the toilet tank and without disconnecting the water supply line.

3. Description of the Prior Art

The use of fill valves for toilet tanks is known in the prior art. More specifically, fill valves for toilet tanks heretofore devised and utilized are known to consist basically of familiar, expected and obvious structural configurations, notwithstanding the myriad of designs encompassed by the crowded prior art which have been developed for the fulfillment of countless objectives and requirements.

Known prior art fill valves for toilet tanks include U.S. Pat. No. 4,945,944; U.S. Pat. No. 4,903,731; U.S. Pat. No. 4,765,363; U.S. Pat. No. 4,180,096; U.S. Pat. No. 4,574,826; and U.S. Pat. No. D314,610.

While these devices fulfill their respective, particular objectives and requirements, the aforementioned patents do not disclose a new Bifurcated Fill Valve Assembly. The inventive device includes a tank fitting extended through and mounted within an opening in a wall of a toilet tank and a fill valve including a valve body having an inlet portion wherein the inlet portion of the fill valve is releasably coupled to the tank fitting within the toilet tank. As such, the fill valve can be uncoupled from the tank fitting and removed from the toilet tank while the tank fitting remains mounted within the toilet tank and coupled to a water supply conduit that supplies water to the fill valve when in use.

In these respects, the Bifurcated Fill Valve Assembly according to the present invention substantially departs from the conventional concepts and designs of the prior art, and in so doing provides an apparatus primarily developed for the purpose of permitting removal of a fill valve from a toilet tank without disturbing the seal at the toilet tank and without disconnecting the water supply line.

SUMMARY OF THE INVENTION

In view of the foregoing disadvantages inherent in the known types of fill valves for toilet tanks now present in the prior art, the present invention provides a new Bifurcated Fill Valve Assembly construction wherein the same can be utilized for permitting removal of a fill valve from a toilet tank without disturbing the seal at the toilet tank and without disconnecting the water supply line.

The general purpose of the present invention, which will be described subsequently in greater detail, is to provide a new Bifurcated Fill Valve Assembly apparatus and method which has many of the advantages of the fill valves for toilet tanks mentioned heretofore and many novel features that result in a new Bifurcated Fill Valve Assembly which is not anticipated, rendered obvious, suggested, or even implied by any of the prior art fill valves for toilet tanks, either alone or in any combination thereof.

To attain this, the present invention generally comprises a tank fitting extended through and mounted within an opening in a wall of a toilet tank and a fill valve including a valve body having an inlet portion wherein the inlet portion of the fill valve is releasably coupled to the tank fitting within the toilet tank. As such, the fill valve can be uncoupled from the tank fitting and removed from the toilet tank while the tank fitting remains mounted within the toilet tank and coupled to a water supply conduit that supplies water to the fill valve when in use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Bifurcated Fill Valve Assembly apparatus and method which has many of the advantages of the fill valves for toilet tanks mentioned heretofore and many novel features that result in a new Bifurcated Fill Valve Assembly which is not anticipated, rendered obvious, suggested, or even implied by any of the prior art fill valves for toilet tanks, either alone or in any combination thereof.

It is another object of the present invention to provide a new Bifurcated Fill Valve Assembly which may be easily and efficiently manufactured and marketed.

It is a further object of the present invention to provide a new Bifurcated Fill Valve Assembly which is of a durable and reliable construction.

An even further object of the present invention is to provide a new Bifurcated Fill Valve Assembly which is susceptible of a low cost of manufacture with regard to both materials and labor, and which accordingly is then susceptible of low prices of sale to the consuming public, thereby making such Bifurcated Fill Valve Assembly economically available to the buying public.

Still yet another object of the present invention is to provide a new Bifurcated Fill Valve Assembly which provides in the apparatuses and methods of the prior art some of the advantages thereof, while simultaneously overcoming some of the disadvantages normally associated therewith.

Still another object of the present invention is to provide a new Bifurcated Fill Valve Assembly for permitting removal of a fill valve from a toilet tank without disturbing the seal at the toilet tank and without disconnecting the water supply line. Traditionally, removal of a fill valve from a toilet tank required disconnecting the water supply line from the inlet portion of the fill valve and disturbing the seal at the toilet tank. Accordingly, it is an object of the present invention to permit removal of the fill valve from the toilet tank without breaking the seal at the toilet tank and without disturbing the connection to the water supply line. Thus, the present invention eliminates practices traditionally required for the removal and replacement of a fill valve from a toilet tank.

Yet another object of the present invention is to provide a new Bifurcated Fill Valve Assembly which includes a tank fitting extended through and mounted within an opening in a wall of a toilet tank and a fill valve including a valve body having an inlet portion wherein the inlet portion of the fill valve is releasably coupled to the tank fitting within the toilet tank. As such, the fill valve can be uncoupled from the tank fitting and removed from the toilet tank while the tank fitting remains mounted within the toilet tank and coupled to a water supply conduit that supplies water to the fill valve when in use.

Still yet another object of the present invention is to provide a new Bifurcated Fill Valve Assembly that allows for removal of a fill valve from a toilet tank while the toilet tank is full of water. Traditionally, to avoid spilling water, a fill valve installed in the bottom wall of a toilet tank could only be removed when the toilet tank was empty. Even so, a small quantity of water would typically still remain within the toilet tank and would spill through the opening in the bottom wall of the toilet tank. Accordingly, it is an object of the present invention to permit removal of the fill valve from the toilet tank while the toilet tank is full of water thereby eliminating the need to completely empty the toilet tank.

Even still another object of the present invention is to provide a new Bifurcated Fill Valve Assembly that provides an improved system for mounting a fill valve within a toilet tank. Moreover, a system that renders installation of the fill valve convenient and facilitates rapid removal and replacement of the fill valve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an illustration of the present invention installed in a toilet tank.

FIG. 4 is an exploded illustration of a first embodiment of the present invention.

FIG. 5 is a top view of the tank fitting of the first embodiment from the perspective of line 5—5 of FIG. 4.

FIG. 6 is a cross sectional view of the first embodiment of the present invention.

FIG. 7 is an exploded illustration of a second embodiment of the present invention.

FIG. 8 is a cross sectional view of the second embodiment of the present invention.

FIG. 9 is an exploded illustration of a third embodiment of the present invention.

FIG. 10 is a cross sectional view of the third embodiment of the present invention.

FIG. 11 is an exploded illustration of a fourth embodiment of the present invention.

FIG. 12 is a cross sectional view of the fourth embodiment of the present invention.

DESCRIPTION OF THE PREFERRED EMBODIMENT

Figure 1:
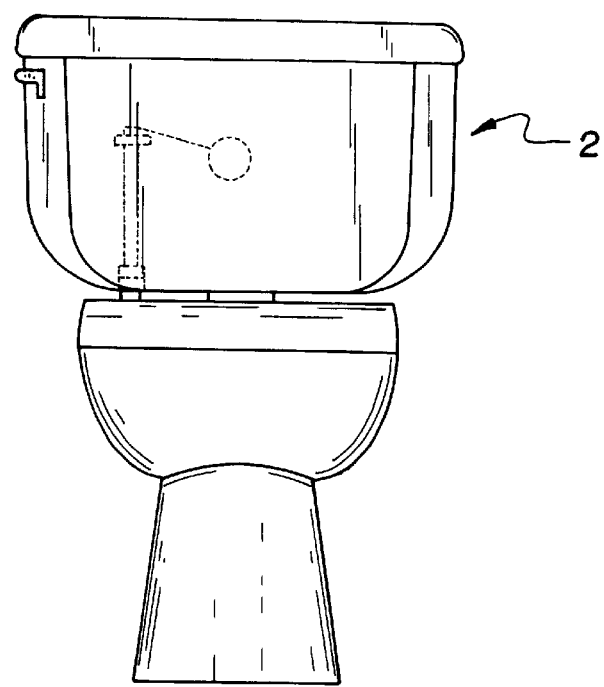
FIG. 1 is a front view of the environment of a new Bifurcated Fill Valve Assembly according to the present invention.

With reference now to the drawings, and in particular to FIGS. 1 through 12 thereof, a new Bifurcated Fill Valve Assembly embodying the principles and concepts of the present invention and generally designated by the reference numeral 10 will be described.

More specifically, it will be noted that the Bifurcated Fill Valve Assembly 10 comprises a tank fitting 20 extended through and mounted within an opening 4 in a wall 3 of a toilet tank 2 and a fill valve 30 including a valve body 31 having an inlet portion 32 wherein the inlet portion 32 of the fill valve 30 is releasably coupled to the tank fitting 20 within the toilet tank 2. As such, the fill valve 30 can be uncoupled from the tank fitting 20 and removed from the toilet tank 2 while the tank fitting 20 remains mounted within the toilet tank 2 and coupled to a water supply conduit 12 that supplies water to the fill valve 30 when in use.

Figure 2:
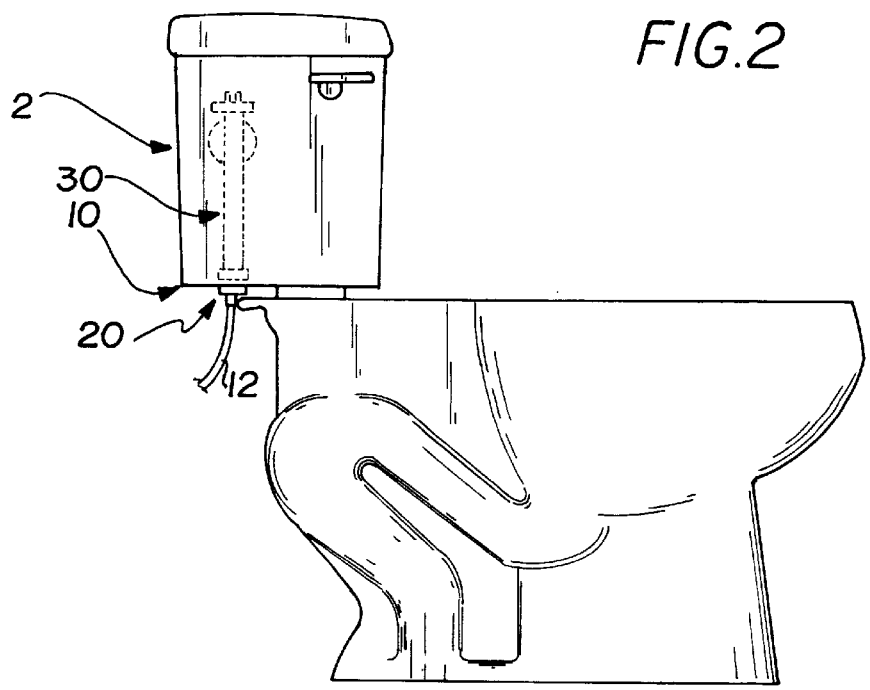
FIG. 2 is a side thereof.

As best illustrated in FIGS. 1 and 2, it can be shown that the present invention is intended for use in mounting a fill valve 30 within a toilet tank 2 wherein a wall 3 of the toilet tank 2, typically a bottom wall, has an opening 4 therein. The fill valve 30 is supplied with water from a water supply conduit 12 and maintains the water within the toilet tank 2 at a predetermined level.

As best illustrated in FIGS. 3 through 6, it can be shown that the tank fitting 20 has an inlet end 21 communicating with the water supply conduit 12 and an outlet end 22. An upper flange 23 having an upper surface 24, a lower surface 25, and external threads 26 protrudes from the tank fitting 20 adjacent the outlet end 22. The tank fitting 20 is extended through and mounted within the opening 4 in the wall 3 of the toilet tank 2 such that the inlet end 21 protrudes from the wall 3 of the toilet tank 2 and such that the outlet end 22 is disposed within the toilet tank 2. A tank wall gasket 19 is interposed between the tank fitting 20 and the wall 3 of the toilet tank 2. The tank wall gasket 19 is held in compression by the lower surface 25 of the upper flange 23 so as to seal the opening 4 in the wall 3 of the toilet tank 2 and prevent leakage of water from the toilet tank 2.

A mounting nut 17 is provided for mounting the tank fitting 20 within the opening 4 in the wall 3 of the toilet tank 2 and a coupling nut 13 is provided for coupling the water supply conduit 12 to the inlet end 21 of the tank fitting 20. The mounting nut 17 and the coupling nut 13 each have internal threads for mating with external threads provided on the tank fitting 20.

In use, the mounting nut 17 is threaded onto the inlet end 21 of the tank fitting 20 until the mounting nut 17 engages the wall 3 of the toilet tank 2 so as to mount the tank fitting 20 in position and to effectuate a seal between the tank fitting 20 and the wall 3 of the toilet tank 2 with the tank wall gasket 19. Thereafter, the coupling nut 13, with the water supply conduit 12 extending therethrough, is threaded onto the inlet end 21 of the tank fitting 20. The coupling nut 13 includes a flanged end 14 which, in conjunction with a thrust washer 15, functions to deform a cone washer 16 into sealing engagement between the water supply conduit 12 and the inlet end 21 of the tank fitting 20.

The fill valve 30 includes a valve body 31 including an inlet portion 32 wherein the inlet portion 32 has an inlet end 33 communicating with the outlet end 22 of the tank fitting 20. A lower flange 34 protrudes from the inlet portion 32 of the valve body 31 adjacent the inlet end 33. A fill valve retaining nut 35 is provided for releasably coupling the fill valve 30 to the tank fitting 20. The fill valve retaining nut 35 has internal threads 36 and has a central hole 37 therethrough for sliding engagement with the inlet portion 32 of the valve body 31. As such, the fill valve retaining nut 35 is slidingly coupled around the inlet portion 32 and retained on the valve body 31 by the lower flange 34.

In use, the fill valve retaining nut 35 is threaded onto the upper flange 23 of the tank fitting 20 until the fill valve retaining nut 35 engages the lower flange 34 of the valve body 31 so as to releasably couple the inlet portion 32 of the fill valve 30 to the tank fitting 20 and to effectuate a seal between the lower flange 34 of the inlet portion 32 and the upper flange 23 of the tank fitting 20. To facilitate a tight seal, an O-ring 29 is interposed between the lower flange 34 of the valve body 31 and the upper flange 23 of the tank fitting 20.

In a second embodiment, as best illustrated in FIGS. 7 and 8, it can be shown that an optional means for releasably coupling a fill valve 230 to a tank fitting 220 is provided. As such, the tank fitting 220 has an inlet end 221 communicating with the water supply conduit 12 and an outlet end 222. An upper flange 223 having a sealing surface 224 and a lower surface 225 protrudes from the tank fitting 220 adjacent the outlet end 222. A plurality of radially symmetrical inwardly projecting flanges 226 are provided within the outlet end 222 of the tank fitting 220 above the sealing surface 224 of the upper flange 223.

The tank fitting 220 is mounted within the opening 4 in the wall 3 of the toilet tank 2 with the mounting nut 17 and the tank wall gasket 19 as outlined above. Furthermore, the water supply conduit 12 is coupled to the inlet end 221 of the tank fitting 220 with the coupling nut 13, the thrust washer 15, and the cone washer 16 as outlined above.

In the second embodiment, the fill valve 230 includes a valve body 231 including an inlet portion 232 wherein the inlet portion 232 has an inlet end 233 communicating with the outlet end 222 of the tank fitting 220. A lower flange 234 protrudes from the inlet portion 232 of the valve body 231 adjacent the inlet end 233 and a plurality of radially symmetrical vanes 235 protrude from the lower flange 234.

In use, the lower flange 234 of the valve body 231 is inserted into the outlet end 222 of the tank fitting 220 until the lower flange 234 abuts the sealing surface 224 of the upper flange 223. Thereafter, the inlet portion 232 is rotated whereby the plurality of radially symmetrical vanes 235 of the lower flange 234 of the valve body 231 lockingly mate with the plurality of radially symmetrical inwardly projecting flanges 226 of the tank fitting 220 so as to releasably couple the inlet portion 232 of the fill valve 230 to the tank fitting 220 and to effectuate a seal between the lower flange 234 of the valve body 231 and the upper flange 223 of the tank fitting 220. To facilitate a tight seal, a gasket 239 is interposed between the lower flange 234 of the valve body 231 and the upper flange 223 of the tank fitting 220.

In a third embodiment, as best illustrated in FIGS. 9 and 10, it can be shown that an optional means for releasably coupling a fill valve 330 to a tank fitting 320 is provided. As such, the tank fitting 320 has an inlet end 321 communicating with the water supply conduit 12 and an outlet end 322. An upper flange 323 having a sealing surface 324 and a lower surface 325 protrudes from the tank fitting 320 adjacent the outlet end 322. A plurality of radially symmetrical vanes 326 protrude from the upper flange 323 of the tank fitting 320 adjacent the sealing surface 324 of the upper flange 323.

The tank fitting 320 is mounted within the opening 4 in the wall 3 of the toilet tank 2 with the mounting nut 17 and the tank wall gasket 19 as outlined above. Furthermore, the water supply conduit 12 is coupled to the inlet end 321 of the tank fitting 320 with the coupling nut 13, the thrust washer 15, and the cone washer 16 as outlined above.

In the third embodiment, the fill valve 330 includes a valve body 331 including an inlet portion 332 wherein the inlet portion 332 has an inlet end 333 communicating with the outlet end 322 of the tank fitting 320. A lower flange 334 protrudes from the inlet portion 332 of the valve body 331 adjacent the inlet end 333. A fill valve retaining nut 335 is provided for releasably coupling the fill valve 330 to the tank fitting 320. The fill valve retaining nut 335 has a central hole 336 therethrough for sliding engagement with the inlet portion 332 of the valve body 331. As such, the fill valve retaining nut 335 is slidingly coupled around the inlet portion 332 and retained on the valve body 331 by the lower flange 334. A plurality of radially symmetrical inwardly projecting flanges 337 are provided within the fill valve retaining nut 335. A pair of opposed fins 338 extend laterally from the fill valve retaining nut 335 so as to facilitate hand tightening of the fill valve retaining nut 335.

In use, the fill valve retaining nut 335 is pressed onto the upper flange 323 of the tank fitting 320 until the lower flange 334 of the valve body 331 engages the sealing surface 324 of the upper flange 323. The fill valve retaining nut 335 is rotated with the pair of opposed fins 338 whereby the plurality of radially symmetrical inwardly projecting flanges 337 of the fill valve retaining nut 335 lockingly mate with the plurality of radially symmetrical vanes 326 of the upper flange 323 so as to releasably couple the inlet portion 332 of the fill valve 330 to the tank fitting 320 and to effectuate a seal between the lower flange 334 of the valve body 331 and the upper flange 323 of the tank fitting 320. To facilitate a tight seal, a gasket 339 is interposed between the lower flange 334 of the valve body 331 and the upper flange 323 of the tank fitting 320.

In a fourth embodiment, as best illustrated in FIGS. 11 and 12, it can be shown that an optional means for releasably coupling a fill valve 430 to a tank fitting 420 is provided. As such, the tank fitting 420 has an inlet end 421 communicating with the water supply conduit 12 and an outlet end 422. An upper flange 423 having a lower surface 424 protrudes from the tank fitting 420 adjacent the outlet end 422 and a male coupling 425 projects upward from the upper flange 423. The male coupling 425 has an annular groove 426 therein and has a sealing surface 427.

The tank fitting 420 is mounted within the opening 4 in the wall 3 of the toilet tank 2 with the mounting nut 17 and the tank wall gasket 19 as outlined above. Furthermore, the water supply conduit 12 is coupled to the inlet end 421 of the tank fitting 420 with the coupling nut 13, the thrust washer 15, and the cone washer 16 as outlined above.

In the fourth embodiment, the fill valve 430 includes a valve body 431 including an inlet portion 432 wherein the inlet portion 432 has an inlet end 433 communicating with the outlet end 422 of the tank fitting 420. A lower flange 434 is provided at the inlet end 433 of the inlet portion 432. A gasket 439 is disposed on the lower flange 434 and a tubular portion 435 extends from the lower flange 434. The tubular portion 435 provides communication with the inlet end 433 of the inlet portion 432.

A female coupling 440 is provided at the inlet end 433 of the inlet portion 432. The female coupling 440 includes a fixed collar 441 extending from the inlet end 433 of the inlet portion 432. The fixed collar 441 includes a cylindrical sidewall 442 in which a plurality of ball bearings 443 are mounted. The female coupling 440 also includes a retractable collar 444 slidingly coupled to the inlet portion 432 of the valve body 431 above the fixed collar 441. The retractable collar 444 is slidable between a lowered position, wherein the retractable collar 444 surrounds the fixed collar 441, and a retracted position, wherein the fixed collar 441 is exposed. When the retractable collar 444 is in the lowered position, the ball bearings 443 are forced inward and when the retractable collar 444 is in the retracted position, the ball bearings 443 are allowed to expand outward.

The retractable collar 444 is biased to the lowered position by a spring 445 coupled around the inlet portion 432 of the valve body 431. The spring 445 is retained between the retractable collar 444 and a flange 446 projecting from the inlet portion 432 of the fill valve 430 above the retractable collar 444.

In use, the retractable collar 444 is retracted and the female coupling 440 is pressed onto the male coupling 425 until the gasket 439 disposed on the lower flange 434 engages the sealing surface 427 of the male coupling 425. The retractable collar 444 is then released whereby the ball bearings 443 are forced into the annular groove 426 of the male coupling 425 so as to matingly couple the inlet portion 432 of the fill valve 430 to the tank fitting 420 and to effectuate a seal between the female coupling 440 of the fill valve 430 and the male coupling 425 of the tank fitting 420.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bifurcated fill valve assembly for use in a toilet tank including a wall having an opening therein and for use with a water supply conduit supplying water to said bifurcated fill valve assembly, said bifurcated fill valve assembly comprising:

a tank fitting extended through and mounted within said opening in said wall of said toilet tank, a tank wall gasket having a frustrated cone shape disposed between said tank fitting and said wall of said toilet tank and extending into said opening in said wall of said toilet tank, said tank wall gasket having a threaded bore threaded engaging said tank fitting for forming a conical seal that is disposed between and engages said wall of said toilet tank and an upper shoulder of said tank fitting;

said water supply conduit coupled to said tank fitting;

a fill valve including a valve body having an inlet portion;

said inlet portion of said fill valve releasably coupled to said tank fitting within said toilet tank;

said tank fitting has an inlet end communicating with said water supply conduit and an outlet end;

said fill valve being uncouplable from said tank fitting and removable from said toilet tank while said tank fitting remains mounted within said opening in said wall of said toilet tank and while said water supply conduit remains coupled to said tank fitting;

a releasable coupling means for releasably coupling said fill valve to said tank fitting, the releasable coupling means comprising an annular collar coupled to the valve body;

an orthogonal upper flange protruding outward radially from an uppermost edge of said tank fitting; and an annular lower flange protruding outward radially from a lowermost edge of said inlet portion of said valve body;

wherein the lower flange of said valve body is abutted against the upper flange of said tank fitting, the annular collar securing the lower flange of said valve body against the upper flange of said tank fitting when the annular collar is threadedly mounted on the upper flange; and wherein a threaded nut is threadedly mounted on the valve body at a location exterior of said toilet tank and compresses the tank wall gasket between the upper shoulder of said tank fitting and the wall of said tank.

2. A bifurcated fill valve assembly for use in a toilet tank including a wall having an opening therein and for use with a water supply conduit supplying water to said bifurcated fill valve assembly said bifurcated fill valve assembly comprising:

a tank fitting extended through and mounted within said opening in said wall of said toilet tank;

said water supply conduit coupled to said tank fitting;

a fill valve including a valve body having an inlet portion;

said inlet portion of said fill valve releasably coupled to said tank fitting within said toilet tank;

said tank fitting has an inlet end communicating with said water supply conduit and an outlet end;

said fill valve uncouplable from said tank fitting and removable from said toilet tank while said tank fitting remains mounted within said opening in said wall of said toilet tank and while said water supply conduit remains coupled to said tank fitting;

a releasable coupling means for releasably coupling said fill valve to said tank fitting;

an upper flange protruding from said tank fitting adjacent said outlet end thereof, a plurality of radially symmetrical vanes protruding from said upper flange, a lower flange protruding from said inlet portion of said valve body adjacent said inlet end thereof, and a fill valve retaining nut coupled to said inlet portion of said valve body, and a plurality of radially symmetrical inwardly projecting flanges provided within said fill valve retaining nut;

pair of opposed fins laterally extending from said fill valve retaining nut, and said plurality of radially symmetrical inwardly projecting flanges of said fill valve retaining nut lockingly mated with said plurality of radially symmetrical vanes of said tank fitting so as to effectuate a seal between said lower flange of said inlet portion of said fill valve and said upper flange of said tank fitting.

3. The bifurcated fill valve assembly of claim 2, further comprising:

said pair of opposed fins laterally extending from said fill valve retaining nut so as to facilitate hand tightening of said fill valve retaining nut.

4. A bifurcated fill valve assembly for use in a toilet tank including a wall having an opening therein and for use with a water supply conduit supplying water to said bifurcated fill valve assembly said bifurcated fill valve assembly comprising:

a tank fitting extended through and mounted within said opening in said wall of said toilet tank;

said water supply conduit coupled to said tank fitting;

a fill valve including a valve body having an inlet portion;

said inlet portion of said fill valve releasable coupled to said tank fitting within said toilet tank;

said tank fitting has an inlet end communicating with said water supply conduit and an outlet end;

said fill valve uncouplable from said tank fitting and removable from said toilet tank while said tank fitting remains mounted within said opening in said wall of said toilet tank and while said water supply conduit remains coupled to said tank fitting;

a releasable coupling means for releasably coupling said fill valve to said tank fitting;

an upper flange protruding from said tank fitting adjacent said outlet end thereof;

a male coupling projecting upward from said upper flange, said male coupling having a sealing surface;

a lower flange projecting inward from said inlet portion of said valve body adjacent said inlet end thereof;

a female coupling provided at said inlet end of said inlet portion of said valve body;

said male coupling matingly coupled with said female coupling so as to effectuate a seal between said lower flange of said inlet portion of said fill valve and said sealing surface of said male coupling of said tank fitting;

said male coupling has an annular groove therein; and said female coupling comprising:

a fixed collar extending from said inlet end of said inlet portion;

said fixed collar having a cylindrical sidewall;

a plurality of ball bearings mounted within said cylindrical sidewall of said fixed collar;

a retractable collar slidingly coupled to said inlet portion of said valve body above said fixed collar, said retractable collar slidable between a lowered position wherein said retractable collar surrounds said fixed collar and a retracted position wherein said fixed collar is exposed; and said plurality of ball bearings forced into said annular groove of said male coupling by said retractable collar when said retractable collar is in said lowered position.

5. The bifurcated fill valve assembly of claim 4, comprising a flange projecting from said inlet portion of said valve body above said retractable collar.

6. The bifurcated fill valve assembly of claim 5, further comprising:

a spring coupled around said inlet portion of said valve body; and said spring positioned between said retractable collar and said flange;

said retractable collar biased to said lowered position by said spring.

* * * * *